(12) United States Patent
Heinrich (10) Patent No.: US 10,543,819 B2
(45) Date of Patent: Jan. 28, 2020

(54) HYDRAULIC BRAKING SYSTEM

(71) Applicant: WABCO GmbH, Hannover (DE)

(72) Inventor: Volker Heinrich, Nordstemmen (DE)

(73) Assignee: WABCO GMBH, Hannover (DE)

( * ) Notice: Subject to any disclaimer, the term of this patent is extended or adjusted under 35 U.S.C. 154(b) by 59 days.

(21) Appl. No.: 15/753,973

(22) PCT Filed: Oct. 5, 2016

(86) PCT No.: PCT/EP2016/001650
§ 371 (c)(1),
(2) Date: Feb. 21, 2018

(87) PCT Pub. No.: WO2017/076483
PCT Pub. Date: May 11, 2017

(65) Prior Publication Data
US 2018/0244250 A1    Aug. 30, 2018

(30) Foreign Application Priority Data
Nov. 4, 2015    (DE) .................. 10 2015 014 205

(51) Int. Cl.
*B60T 8/36*    (2006.01)
*B60T 13/68*    (2006.01)
(Continued)

(52) U.S. Cl.
CPC ............ *B60T 8/3605* (2013.01); *B60T 8/176* (2013.01); *B60T 13/686* (2013.01); *F16K 31/0603* (2013.01); *B60T 2270/10* (2013.01)

(58) Field of Classification Search
CPC .... B60T 8/3605; B60T 8/176; B60T 2270/10; B60T 13/686; F16K 31/0603
See application file for complete search history.

(56) References Cited

U.S. PATENT DOCUMENTS 5,782,267 A * 7/1998 Yoo ....................... B60T 8/3635
137/596.17
6,478,384 B2 * 11/2002 Lulfing ................. B60T 8/4072
188/353

(Continued)

FOREIGN PATENT DOCUMENTS

DE    1555615 A1    10/1970
DE    3240277 A1    5/1984
(Continued)

*Primary Examiner* — Vishal R Sahni
(74) *Attorney, Agent, or Firm* — Leydig, Voit & Mayer, Ltd.

(57) ABSTRACT

A power-assisted hydraulic braking system includes a main brake line into which a setpoint brake pressure can be introduced via a brake valve actuated by a brake pedal, and from which a plurality of wheel brake lines branch off, each leading to an actuating unit of a wheel brake, and a valve arrangement of an ABS controller, comprising an inlet valve disposed between the main brake line and one of the wheel brake lines and an outlet valve disposed between the relevant wheel brake line and a pressureless return line. The inlet valve and the outlet valve are embodied as pressure-controlled 2/2-way switching valves with suitably sized switching cross-sections. At least one pilot control valve is associated with each of the inlet valve and the outlet valve, via which a control connection can be alternately subjected to a low or high control pressure to change over.

20 Claims, 9 Drawing Sheets

(51) Int. Cl.
*B60T 8/176* (2006.01)
*F16K 31/06* (2006.01)

(56) References Cited

U.S. PATENT DOCUMENTS

2002/0033636 A1 3/2002 Lulfing
2016/0304070 A1* 10/2016 Wieder ................ B60T 13/686
2017/0361825 A1* 12/2017 Drumm ................ B60T 8/363

FOREIGN PATENT DOCUMENTS

| DE | 4419107 C1 | 7/1995 |
| DE | 19546056 A1 | 6/1997 |
| DE | 19744389 A1 | 4/1999 |
| DE | 102006024183 A1 | 11/2007 |
| EP | 1013528 B1 | 4/2007 |
| EP | 2256011 A2 | 12/2010 |

* cited by examiner

HYDRAULIC BRAKING SYSTEM

CROSS REFERENCE TO RELATED APPLICATIONS

This application is a U.S. National Stage Application under 35 U.S.C. § 371 of International Application No. PCT/EP2016/001650 filed on Oct. 5, 2016, and claims benefit to German Patent Application No. DE 10 2015 014 205.4 filed on Nov. 4, 2015. The International Application was published in German on May 11, 2017 as WO 2017/076483 A1 under PCT Article 21(2).

FIELD

The invention concerns a power-assisted hydraulic braking system of a wheeled vehicle, with a main brake line into which a setpoint brake pressure can be introduced by means of a brake pedal-operated brake valve, and from which a plurality of wheel brake lines branch off.

BACKGROUND

Whereas passenger vehicles and light utility vehicles usually comprise a pedal force-assisted hydraulic braking system and heavier utility vehicles comprise a power-assisted pneumatic braking system, wheeled vehicles that are provided for off-road use, such as construction machinery and agricultural tractors, are equipped with a power-assisted hydraulic braking system. Because of the necessary high braking forces, the actuating units of the wheel brakes, such as the wheel brake cylinders and brake calipers, in such wheeled vehicles comprise a relatively large displacement volume, which can only be delivered with a power-assisted braking system. Because construction machinery and agricultural tractors usually comprise hydraulic working units or even a hydrostatic drive, a power-assisted hydraulic braking system can advantageously use the hydraulic pressure supply device that is already provided.

In the present case, a power-assisted hydraulic braking system of a wheeled vehicle will be assumed, comprising a main brake line and a plurality of wheel brake lines branching off from the main brake line and each leading to an actuating unit of a wheel brake and a valve arrangement of an ABS controller. A setpoint brake pressure can be introduced into the main brake line by means of a brake valve that is actuated by a driver by means of a brake pedal. With an embodiment of the wheel brakes embodied as drum brakes, the actuating units of the wheel brakes are usually embodied as wheel brake cylinders, wherein the pistons thereof press the relevant brake shoes against the brake drums that are rotationally fixedly joined to the wheel hubs to decelerate the vehicle wheels. With an embodiment of the wheel brakes as disk brakes, the actuating units of the wheel brakes are usually brake calipers, in which the relevant brake linings are pressed by means of pistons against the brake disks that are rotationally fixedly joined to the wheel hubs to decelerate the vehicle wheels.

The valve arrangement of the anti-lock brake system controller (ABS controller) comprises an inlet valve disposed between the main brake line and one of the wheel brake lines and an outlet valve disposed between the relevant wheel brake line and a pressureless return line in each case. In the non-actuated state, the inlet valves are opened and the outlet valves are closed, so that the setpoint brake pressure specified by the driver is also effective in the wheel brake lines and the actuating units of the wheel brakes that are connected to the same. Consequently, the wheeled vehicle involved is decelerated according to the operation of the brake pedal by the driver. However, if during a braking process a wheel that is locked or will shortly become locked is detected by the analysis of revolution rate sensors disposed on the vehicle wheels, the inlet valve of the relevant actuating unit is closed and the associated outlet valve is opened, so that the wheel brake of the relevant vehicle wheel is released. If said vehicle wheel is again rotating at a sufficiently high revolution rate, the inlet valve of said actuating unit is opened again and the associated outlet valve is closed until a large reduction in the revolution rate is detected on the relevant vehicle wheel. By alternately opening and closing the inlet valves and the outlet valves, locking of the vehicle wheels is thus prevented and as a result the ability to brake and steer the relevant wheeled vehicle is maintained.

In order to enable a reduction of the brake pressure via the main brake line and the brake valve in the event of inlet valves and outlet valves being closed at the same time as a result of a fault, if by releasing the brake pedal there is a higher brake pressure in one of the wheel brake lines than in the main brake line, safety valves are usually provided. Said safety valves can be implemented in the form of non-return valves, in each case disposed parallel to the inlet valves between the wheel brake lines and the main brake line and opening towards the main brake line, or in the form of non-return valves or emergency opening functions integrated within the inlet valves with an opening direction towards the main brake line.

In DE 195 46 056 A1 and EP 1 013 528 B1, power-assisted hydraulic braking systems of a motor vehicle are described, each comprising two brake circuits, a valve arrangement of an ABS controller and a valve arrangement of an anti-slip controller (ASR controller). The inlet valves and the outlet valves of the valve arrangement of the ABS controller are each embodied as 2/2-way solenoid switching valves. Whereas the safety valves for the valve arrangement of the ABS controller according to DE 195 46 056 A1 are embodied as non-return valves, each disposed parallel to the inlet valves, the valve arrangement of the ABS controller according to EP 1 013 528 B1 comprises non-return valves or non-return valve functions integrated within the inlet valves for this purpose.

Because of a regulation of the European Union, all braking systems of agricultural vehicles that reach or exceed a maximum speed of 40 km/h must comprise an ABS controller by no later than 01.01.2020. Especially for large and heavy agricultural tractors with correspondingly large-dimension wheel brakes, where they are fitted with a power-assisted hydraulic braking system, valve arrangements of the ABS controller with high volumetric throughputs and very high ABS control frequency are therefore necessary. Said requirement is hardly achievable with inlet valves and outlet valves embodied as solenoid switching valves, because either the switching cross-sections of the solenoid switching valves are too small for this or the switching dynamics of the solenoid switching valves are too low and the current drain thereof is too high.

ABS control valves are offered by MICO Inc., USA for the ABS control of heavy wheeled vehicles for off-road use, being embodied as 3/3-way proportional solenoid valves and each combining the functions of an inlet valve and of an outlet valve. Such ABS control valves are indeed configured for a high volumetric throughput, but only enable a relatively low ABS control frequency.

SUMMARY

In an embodiment, the present invention provides a power-assisted hydraulic braking system of a wheeled vehicle. The power-assisted hydraulic braking system includes a main brake line into which a setpoint brake pressure can be introduced via a brake valve actuated by a brake pedal, and from which a plurality of wheel brake lines branch off, each leading to an actuating unit of a wheel brake, and a valve arrangement of an ABS controller, comprising an inlet valve disposed between the main brake line and one of the wheel brake lines and an outlet valve disposed between the relevant wheel brake line and a pressureless return line. The inlet valve and the outlet valve are embodied as pressure-controlled 2/2-way switching valves with suitably sized switching cross-sections. At least one pilot control valve embodied as a solenoid switching valve is associated with each of the inlet valve and the outlet valve, via which a control connection of the relevant inlet or outlet valve can be alternately subjected to a low or high control pressure to change over.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Due to the future requirements on the braking systems of heavy wheeled vehicles for off-road use, embodiments of the present invention provide a valve arrangement of an ABS controller of the aforementioned design type for a power-assisted hydraulic braking system of a wheeled vehicle, which combines a high volumetric throughput with a high ABS control frequency and low energy costs for actuation of the ABS valves.

According to an embodiment of the invention, the inlet valve and the outlet valve are embodied as pressure-controlled 2/2-way switching valves with suitably sized switching cross-sections, and at least one pilot control valve that is embodied as a solenoid switching valve is associated with each of the inlet valve and the outlet valve, by means of which the control connection of the relevant inlet valve or outlet valve can be subjected to a low or high control pressure to alternately change over.

Embodiments of the present invention provide power-assisted hydraulic braking systems for a wheeled vehicle with a main brake line and a valve arrangement of an ABS controller. A setpoint brake pressure can be introduced into the main brake line by means of a brake valve that can be actuated by a brake pedal. A plurality of wheel brake lines branch off from the main brake line, each leading to an actuating unit of a wheel brake, such as wheel brake cylinders or brake calipers. The valve arrangement of the ABS controller comprises an inlet valve disposed between the main brake line and one of the wheel brake lines and an outlet valve disposed between the relevant wheel brake line and a pressureless return line in each case.

In order to achieve the high volumetric throughput necessary for the wheel brakes of heavy wheeled vehicles provided for off-road use in combination with a high ABS control frequency and low energy costs for the actuation of the ABS valves, according to embodiments of the invention the inlet valve and the outlet valve are embodied as pressure-controlled 2/2-way switching valves with suitably large switching cross-sections, each of which can be controlled by means of at least one pilot control valve embodied as a solenoid switching valve. Therefore, a control connection of the relevant inlet valve or outlet valve can be alternately subjected to a low or high control pressure by means of the associated pilot control valve or the associated pilot control valves to change over. The solenoid valves used as pilot control valves have high switching dynamics and a low current consumption of the solenoid coils thereof, so that the valve arrangement of the ABS controller as a whole combines a high volumetric throughput with a high ABS control frequency and low energy costs for the actuation of the ABS valves thereof.

In the case of a possible first design type of the pilot control valves, it is provided that in each case two pilot control valves embodied as 2/2-way solenoid switching valves are associated with the inlet valve and/or the outlet valve, of which the first pilot control valve is disposed between a high-pressure line branching off from the main brake line and a control pressure line leading to the relevant control connection, which are shut off from each other in the deenergized state of the first pilot control valve and are connected to each other in the energized state of the first pilot control valve, and of which the second pilot control valve is disposed between the control pressure line and a low-pressure line leading to the return line, which are connected to each other in the deenergized state of the second pilot control valve and are shut off from each other in the energized state of the second pilot control valve.

In the case of a possible second design type of the pilot control valves, it is provided that a pilot control valve embodied as a 3/2-way solenoid switching valve is associated with the inlet valve and/or the outlet valve in each case, which is disposed between a high-pressure line branching off from the main brake line, a control pressure line leading to the relevant control connection and a low-pressure line leading to the return line, wherein the control pressure line is connected to the low-pressure line and is shut off from the high-pressure line in the deenergized state of the relevant pilot control valve, and wherein the control pressure line is connected to the high-pressure line and shut off from the low-pressure line in the energized state of the relevant pilot control valve.

In both types of design of the pilot control valves mentioned, the brake pressure prevailing in the main pressure line is thus used as the high control pressure and the ambient pressure prevailing in the return line is used as the low control pressure, which are directly accessible and can be tapped from the control pressure lines (low-pressure line and high-pressure line) branching off from the return line and the main brake line.

In a valve arrangement of an ABS controller, the same type of solenoid valves is usually used for actuation of the inlet and outlet valves in order to simplify the actuation and to save costs by the use of identical parts. In principle however, it is also possible to use pilot control valves of different design types in a valve arrangement, wherein for example the inlet valves are each actuated by means of two 2/2-way solenoid switching valves and the outlet valves are each actuated by means of a 3/2-way solenoid switching valve.

Regarding the design type thereof, the inlet valve and/or the outlet valve can be embodied as a poppet valve comprising at least one connection for a wheel brake line, the control connection for the relevant control pressure line and a connection for the main brake line or for the return line.

The inlet valve embodied as a poppet valve preferably comprises a valve bore that narrows radially inwards in stages with an inner-lying valve seat, in which are disposed a seat piston that is held by a valve spring in a position raised from the valve seat in the rest state, i.e. in the case in which the control connection is subjected to a low control pressure, and axially on the outside a control piston with a control connection to the seat piston, wherein the main brake line opens radially into the valve bore axially inwards next to the valve seat, wherein the wheel brake line opens radially into the valve bore axially on the outside next to the valve seat, and the control connection for the associated control pressure line is disposed radially outwards on the valve bore.

Owing to said connection of the main brake line to the valve bore, a control force acting on the seat piston is produced that is opposite to the control force acting on the larger control piston and thus in particular acts on the control movement of the seat piston so as to damp the control movement before contact with the valve seat.

The seat piston of the inlet valve preferably comprises a seat section with reduced diameter on the end thereof facing the valve seat, whereby the switching cross-section is enlarged and thus an increased volumetric throughput of the inlet valve is achieved.

The outlet valve embodied as a poppet valve preferably comprises a valve bore narrowing axially inwards on both sides in stages with an axially inner-lying valve seat, in which are disposed a seat piston axially on one side in the rest state, i.e. in which the control connection is subjected to a low control pressure, held by a valve spring in a position in contact with the valve seat, and axially opposite a control piston with a control connection to the seat piston, wherein the return line opens radially into the valve bore next to the valve seat and axially on the control piston side, wherein the wheel brake line opens radially into the valve bore next to the valve seat and axially on the seat piston side, and wherein the control connection for the associated control pressure line is disposed in the valve bore on the control piston side and axially on the outside.

In a development of said design type, the outlet valve can also be embodied as a cascaded poppet valve comprising a valve bore narrowing on both sides axially inwards in stages with an axially inner-lying first valve seat, wherein axially on one side a seat sleeve loaded in the opening direction by a first valve spring with a second valve seat and radial bores axially adjacent thereto are disposed in said valve bore, wherein a seat piston is disposed radially within the seat sleeve and held in the rest state by a second valve spring in a position in contact with the second valve seat and a control piston is disposed supported on the seat sleeve, and axial oppositely connected to the seat piston, wherein the return line opens radially into said valve bore next to the first valve seat and axially on the control piston side, wherein the wheel brake line opens radially into said valve bore next to the first valve seat and axially on the seat sleeve side, and the control connection for the associated control pressure line is disposed axially on the outside on the control piston side. The spring stiffness of the second valve spring is greater than the spring stiffness of the first valve spring, so that the seat sleeve is in contact with the first valve seat in the non-actuated rest state of the outlet valve. Owing to the cascaded embodiment of the poppet valve, on the one hand the switching cross-section is enlarged and hence an increased volumetric throughput of the outlet valve is achieved, and on the other hand the switching dynamics of the outlet valve are increased.

With the two said embodiments of the outlet valve, it is preferably provided that the seat piston of the outlet valve comprises a seat section with reduced diameter on the end thereof facing the valve seat or the second valve seat, and that a control pressure line branching off from the wheel brake line is fed into the valve bore on the side of the seat piston facing away axially from the valve seat. Owing to the reduced diameter of the seat section, the switching cross-section is enlarged and hence an increased volumetric throughput of the outlet valve is achieved. Owing to the delivery of the brake pressure prevailing in the wheel brake line to the outer end wall of the seat piston, the pressure force acting on the seat side on a smaller annular surface of the seat piston is over-compensated, so that with a lower brake pressure in the main brake line the outlet valve is securely closed or is held closed.

Alternatively to the embodiment as a poppet valve, the inlet valve and/or the outlet valve can also be embodied as a slide valve comprising at least one connection for the wheel brake line, the control connection for the relevant control pressure line and a connection for the main brake line or for the return line.

The inlet valve embodied as a slide valve preferably comprises a cylindrical valve bore, in which is disposed a control piston held by a valve spring in an open switch position in the rest state and comprising an annular control web and an axially adjacent annular connecting groove, wherein the main brake line opens radially into the valve bore in the region of the control web of the control piston, wherein the wheel brake line opens radially into the valve bore in the region of the connecting groove of the control piston, and the control connection for the associated control pressure line is disposed on the outside of the valve bore facing axially away from the valve spring.

Similarly, the outlet valve embodied as a slide valve preferably comprises a cylindrical valve bore, in which is disposed a control piston held by a valve spring in a closed switch position in the rest state and with an annular control web and an axially adjacent annular connecting groove, wherein the return line opens radially into in the valve bore in the region of the control web, wherein the wheel brake line opens radially into the valve bore in the region of the connecting groove, and in which the control connection for the associated control pressure line is disposed on the outside facing axially away from the valve spring.

To produce a limited hydraulic counterforce, which as with the relevant valve spring acts on the respective control piston against the control force introduced via the associated control connection, the valve bore of the inlet valve and/or the outlet valve comprises a coaxial expansion bore with a reduced diameter compared to the valve bore, in which a cylindrical pin that is in contact with or can be brought into contact with the control piston is guided axially movably, and into which a control pressure line branching off from the main brake line is fed at the end.

In order to enable a rapid build-up of pressure in the wheel brake line with the brake pedal released and the inlet and outlet valves closed, a non-return valve opening towards the main brake line is advantageously disposed in parallel with the inlet valve between the wheel brake line and the main brake line.

To simplify the assembly on the relevant wheeled vehicle, the inlet valve, the outlet valve and the associated pilot control valves of the valve arrangement of the ABS controller associated with a wheel brake are combined within a valve module, which is fastened to the frame of the wheeled vehicle at the minimum possible distance from the relevant wheel brake.

Figure 1:
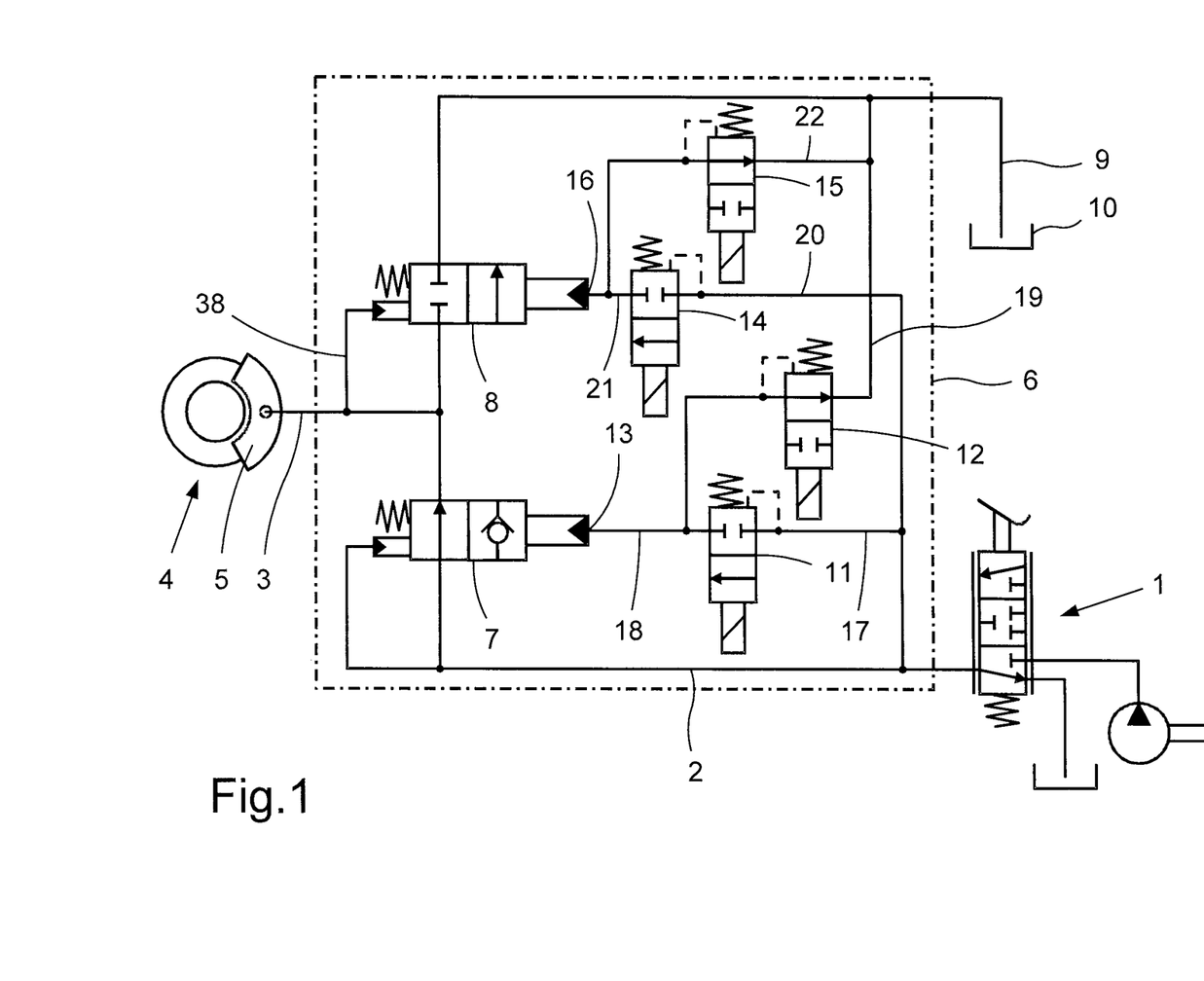
FIG. 1 shows a first valve arrangement of an ABS controller according to an embodiment of the invention for a power-assisted hydraulic braking system of a wheeled vehicle in a schematic view.

In FIG. 1, a section of a power-assisted hydraulic braking system of a wheeled vehicle is shown in a purely schematic form, comprising the valve arrangement 6 of an ABS controller associated with a single wheel brake 4. A wheel brake line 3 leading to an actuating unit 5 of the wheel brake 4 branches off from a main brake line 2, into which a setpoint brake pressure can be introduced by means of a brake valve 1 operated by means of a brake pedal. In the present case, the wheel brake 4 is embodied as a disk brake by way of example, so that the actuating unit 5 thereof is embodied as a brake caliper. The valve unit 6 of the ABS controller comprises an inlet valve 7 disposed between the main brake line 2 and the wheel brake line 3 and an outlet valve 8 disposed between the wheel brake line 3 and a pressureless return line 9 leading into a collecting container 10 for the used pressure medium.

According to the embodiment of the invention shown in FIG. 1, the inlet valve 7 and the outlet valve 8 are embodied as pressure-controlled 2/2-way switching valves with suitably large switching cross-sections, with each of which in the present case two pilot control valves 11, 12; 14, 15 embodied as 2/2-way solenoid switching valves are associated, by means of which a control connection 13; 16 of the relevant inlet valve 7 or outlet valve 8 can alternately be subjected to a low or high control pressure to change over. Owing to said embodiment and arrangement, the inlet and outlet valves 7, 8 comprise a high volumetric throughput and a high ABS control frequency. In addition, the energy costs for actuating the inlet and outlet valves 7, 8 by means of the pilot control valves 11, 12; 14, 15 are relatively low.

The first pilot control valve 11 of the inlet valve 7 is disposed between a high-pressure line 17 branching off from the main brake line 2 and a control pressure line 18 leading to the control connection 13 of the inlet valve 7. In the rest state, i.e. in the deenergized state of the magnetic coil of the first pilot control valve 11, the high-pressure line 17 and the control pressure line 18 are shut off from each other, whereas the same are connected to each other in the operating state, i.e. in the energized state of the magnetic coil of the first pilot control valve 11.

The second pilot control valve 12 of the inlet valve 7 is disposed between the control pressure line 18 and a low-pressure line 19 that is connected to the return line 9. In the rest state, i.e. in the deenergized state of the magnetic coil of the second pilot control valve 12, the control pressure line 18 and the low-pressure line 19 are connected together, whereas in the operating state, i.e. the energized state of the magnetic coil of the second pilot control valve 12, the control pressure line 18 and the low-pressure line 19 are shut off from each other. Thus, the control connection 13 of the inlet valve 7 is subjected to the low control pressure or with ambient pressure in the non-actuated state of the associated pilot control valves 11, 12. Consequently, the inlet valve 7 is then in the depicted rest position, in which the wheel brake line 3 is connected to the main brake line 2.

By an operation, i.e. by changing over the two associated pilot control valves 11, 12, the control pressure line 18 is isolated from the low-pressure line 19 and is connected to the high-pressure line 17 via the first pilot control valve 11. This causes the control connection 13 of the inlet valve 7 to be subjected to the brake pressure prevailing in the main brake line 2, whereby the inlet valve 7 is changed over into the operating position thereof, in which the wheel brake line 3 is shut off from the main brake line 2.

The first pilot control valve 14 of the outlet valve 8 is disposed between a high-pressure line 20 branching off from the main brake line 2 and a control pressure line 21 leading to the control connection 16 of the outlet valve 8. The high-pressure line 20 and the control pressure line 21 are shut off from each other in the rest state of the first pilot control valve 14, and are connected together in the operating state of the first pilot control valve 14. The second pilot control valve 15 of the outlet valve 8 is disposed between the control pressure line 21 and a low-pressure line 22 leading into the return line 9. The control pressure line 21 and the low-pressure line 22 are connected to each other in the rest state of the second pilot control valve 15, and are shut off from each other in the operating state of the second pilot control valve 15. Thus, the control connection 16 of the outlet valve 8 is subjected to the low control pressure or to the ambient pressure in the non-actuated state of the associated pilot control valves 14, 15. Consequently, the outlet valve 8 is then in the depicted rest position, in which the wheel brake line 3 is shut off from the return line 9.

By an operation, i.e. by changing over the two 8 pilot control valves 14, 15 associated with the outlet valve, the control pressure line 21 is isolated from the low-pressure line 22 and is connected to the high-pressure line 20 via the first pilot control valve 14. As a result, the control connection 16 of the outlet valve 8 is subjected to the brake pressure prevailing in the main brake line 2, whereby the outlet valve 8 is changed over into the operating position thereof, in which the wheel brake line 3 is connected to the return line 9.

In the ABS controller, by alternately opening and closing the inlet valve 7 and the outlet valve 8 the brake pressure prevailing in the wheel brake line 3 acting on the wheel brake 4 is modulated so that locking of the relevant vehicle wheel is prevented, and the wheeled vehicle remains able to be braked and steered.

Figure 1A:
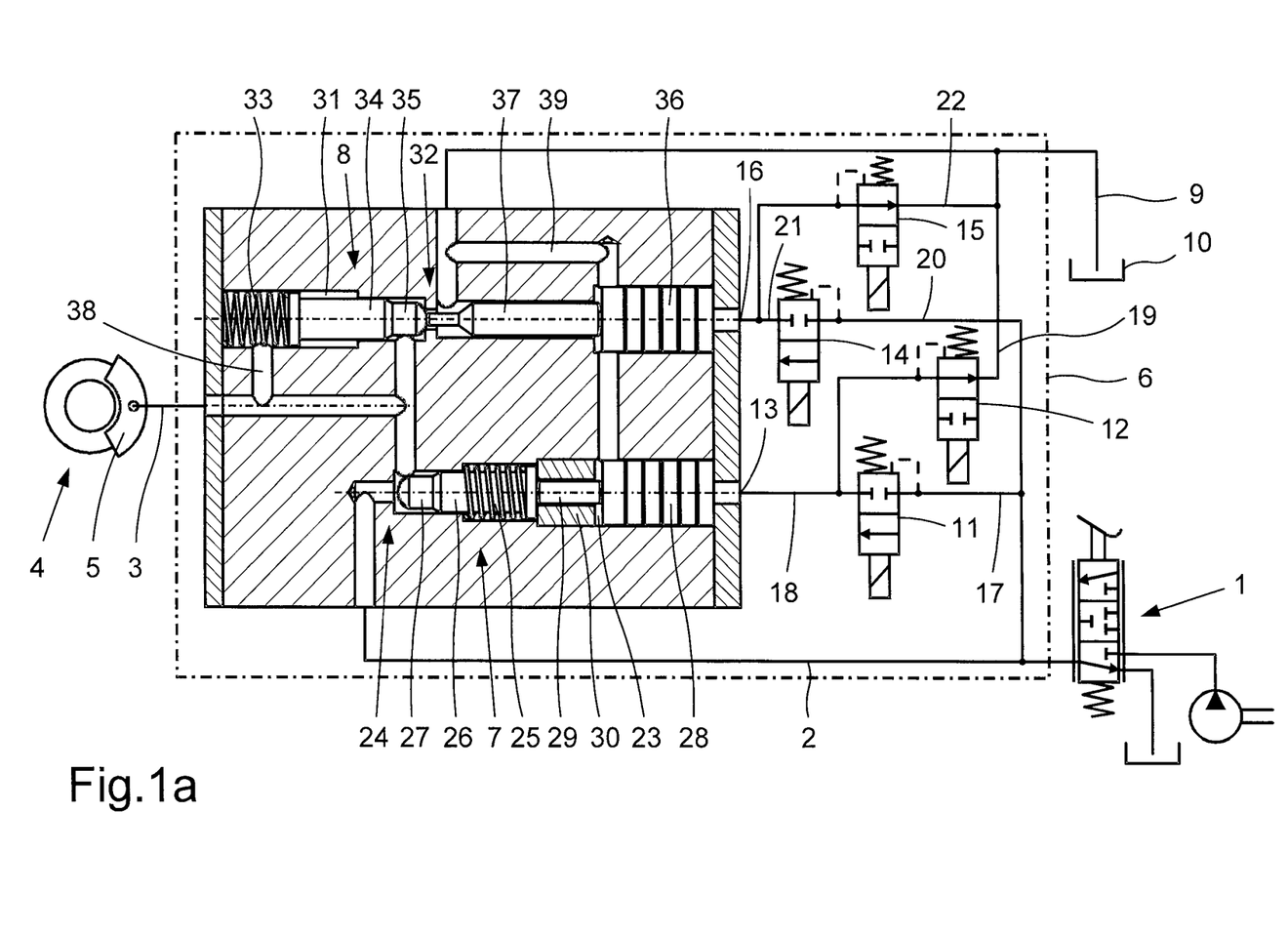
FIG. 1a shows the valve arrangement according to FIG. 1 with a schematic sectional representation of the relevant inlet and outlet valves.

In FIG. 1a, the valve arrangement 6 according to FIG. 1 is depicted with the inlet and outlet valves 7, 8 represented centrally sectioned. It can be clearly seen here that the inlet valve 7 and the outlet valve 8 are embodied as poppet valves in the present case. The inlet valve 7 comprises a valve bore 23 narrowing axially inwards in stages with an inner-lying valve seat 24. A seat piston 26 held in a position raised from the valve seat 24 and a control piston 28 are guided axially movably in the valve bore 23 in the rest state of a valve spring 25. The seat piston 26 comprises a seat section 27 with reduced diameter at the end thereof facing away from the valve seat 24. The control piston 28 is disposed relative to the valve seat 24 axially outside the seat piston 26 and adjacent to the control connection 13 of the relevant control pressure line 18 and is connected to the seat piston 26 via a rod 29 centrally guided in a sleeve 30. The main brake line 2 opens axially inwards into the valve bore 23 next to the valve seat 24 and the wheel brake line 3 opens radially into the valve bore 23 next to the valve seat 24 and axially further outwards.

Owing to said connection of the main brake line 2 to the valve bore 23 of the inlet valve 7, control force is produced that damps the control movement of the seat piston 26. The narrowing of the seat piston 26 at the end causes an increase of the switching cross-section and thus of the volumetric throughput through the inlet valve 7.

According to FIG. 1a, the outlet valve 8 comprises on both sides a valve bore 31 narrowing axially inwards in stages with an axially inner-lying valve seat 32. A seat piston 34 that is axially on one side and that is held by a valve spring 33 in a position in contact with the valve seat 32 in the rest state, and a control piston 36 that is axially opposite are axially movably guided in the valve bore 31. The seat piston 34 comprises a seat section 35 with a reduced diameter on the end thereof facing towards the valve seat 32. The control piston 36 is disposed relative to the valve seat 32 axially opposite to the seat piston 34 adjacent to the control connection 16 of the relevant control pressure line 21 and is connected to the seat piston 34 by means of a tappet 37. The return line 9 opens radially into the valve bore 31 on the control piston side axially next to the valve seat 32 and the wheel brake line 3 opens radially into the valve bore 31 on the seat piston side axially next to the valve seat 32. A control pressure line 38 branching off from the wheel brake line 3 is fed into the valve bore 31 on the side of the seat piston 34 facing axially away from the valve seat 32.

The narrowing of the seat piston 34 at the end causes an increase of the switching cross-section and thus of the volumetric throughput through the outlet valve 8. Owing to the feed of the brake pressure from the wheel brake line 3 via the control pressure line 38 to the larger-diameter outer end wall of the seat piston 34, the design-related pressure force acting on an annular surface of the seat piston 34 on the seat side in the opening direction is over-compensated, so that the outlet valve 8 is securely closed or is held closed at lower brake pressure in the main brake line 2. To relieve pressure and to discharge leakage oil, a leakage line 39 in the contact region of each control piston 28, 36 with the tappet 29, 37 leads from the valve bore 23 of the inlet valve 7 via the valve bore 31 of the outlet valve 8 into the return line 9 leading to the collecting container 10.

Figure 1B:
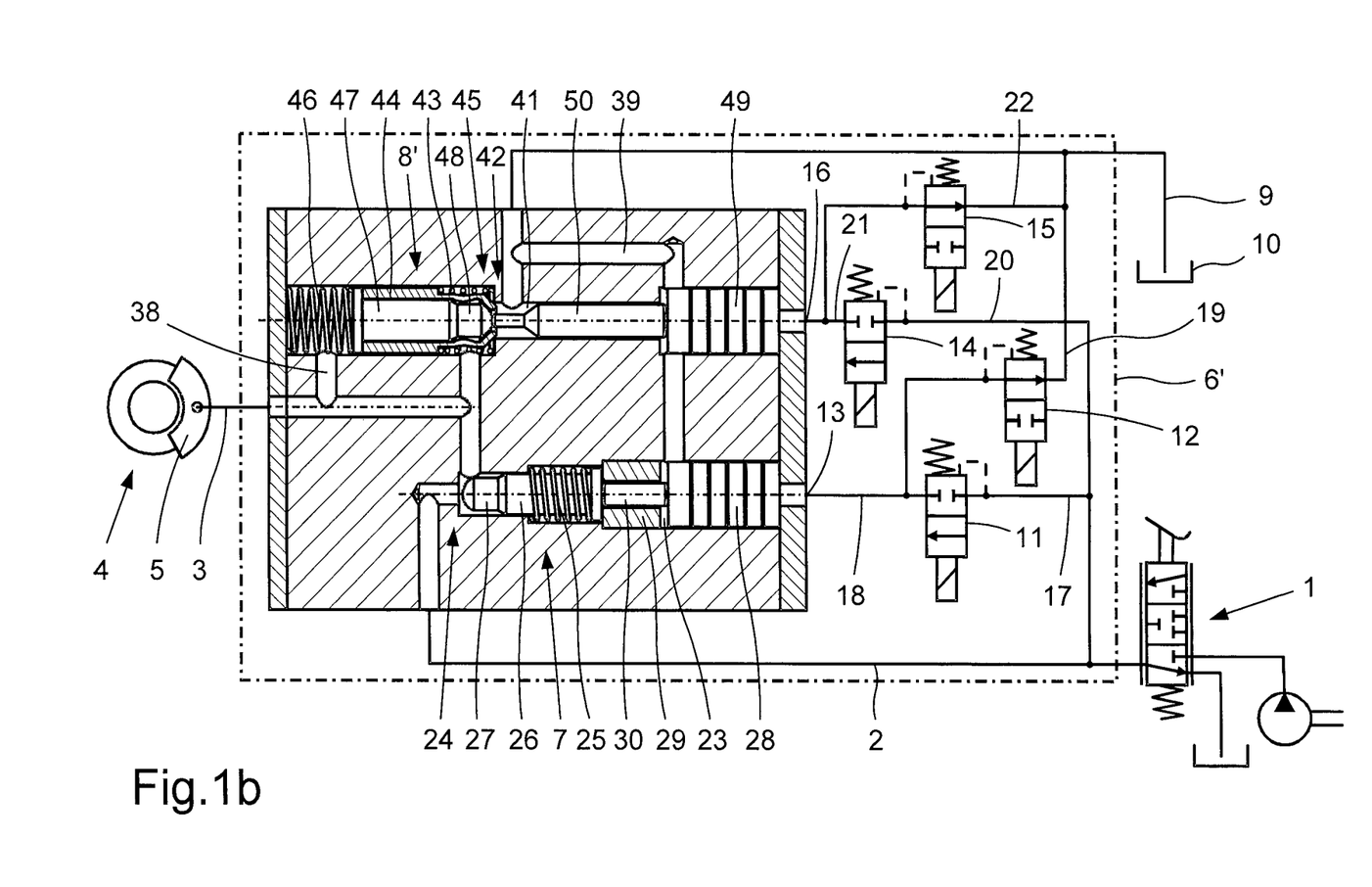
FIG. 1b shows the valve arrangement according to FIG. 1 with a schematic sectional representation of the relevant inlet and outlet valves and a modified embodiment of the outlet valve.

The valve arrangement 6' depicted in FIG. 1b with the centrally sectioned representation of the inlet valve 7 and the outlet valve 8' differs from the corresponding depiction in FIG. 1a only by a modified embodiment of the outlet valve 8'. The outlet valve 8' is now embodied as a so-called cascaded poppet valve comprising a valve bore 41 narrowed on both sides axially inwards in stages with an axially inner-lying first valve seat 42. A seat sleeve 44 with a second valve seat 45 loaded in the opening direction by a first valve spring 43 and radial bores axially adjacent thereto that are axially on one side, and a control piston 49 that is axially opposite thereto are axially movably guided in the valve bore 41. A seat piston 47 that is held by a second valve spring 46 in a position in contact with the second valve seat 45 in the rest state, and that is supported on the seat sleeve 44, is axially movably disposed within the seat sleeve 44.

The spring stiffness of the second valve spring 46 is greater than the spring stiffness of the first valve spring 43, so that the seat sleeve 44 is in contact with the first valve seat 42 in the non-actuated rest state of the outlet valve 8'. The seat piston 47 comprises a seat section 48 with a reduced diameter on the end thereof facing towards the second valve seat 45.

The control piston 49 is disposed relative to the first valve seat 42 axially opposite to the seat sleeve 44 and adjacent to the control connection 16 of the relevant control pressure line 21 and has a control connection to the seat piston 47 via a tappet 50. Similarly to the first embodiment of the outlet valve 8 according to FIG. 1a, the return line 9 opens axially into the valve bore 41 on the control piston side next to the first valve seat 42 and the wheel brake line 3 opens radially into the valve bore 41 axially on the seat piston side next to the first valve seat 42. Also with said embodiment of the outlet valve 8', a control pressure line 38 branching off from the wheel brake line 3 is fed into the valve bore 41 on the side of the seat piston 47 axially facing away from the first valve seat 42.

Owing to the cascaded embodiment of the poppet valve, the switching cross-section is enlarged and thus an increased volumetric throughput in the outlet valve 8' is achieved. The seat piston 47 narrowing at the end causes an additional increase of the switching cross-section and thus of the volumetric throughput of the outlet valve 8'. Owing to the feed of the brake pressure from the wheel brake line 3 via the control pressure line 38 to the larger-diameter axial outer end wall of the seat piston 47, the design-related pressure force acting on the seat side in the opening direction on annular surfaces of the seat sleeve 44 and the seat piston 47 is over-compensated, so that at lower brake pressures in the main brake line 2 the outlet valve 8' is securely closed or is held closed.

Figure 2:
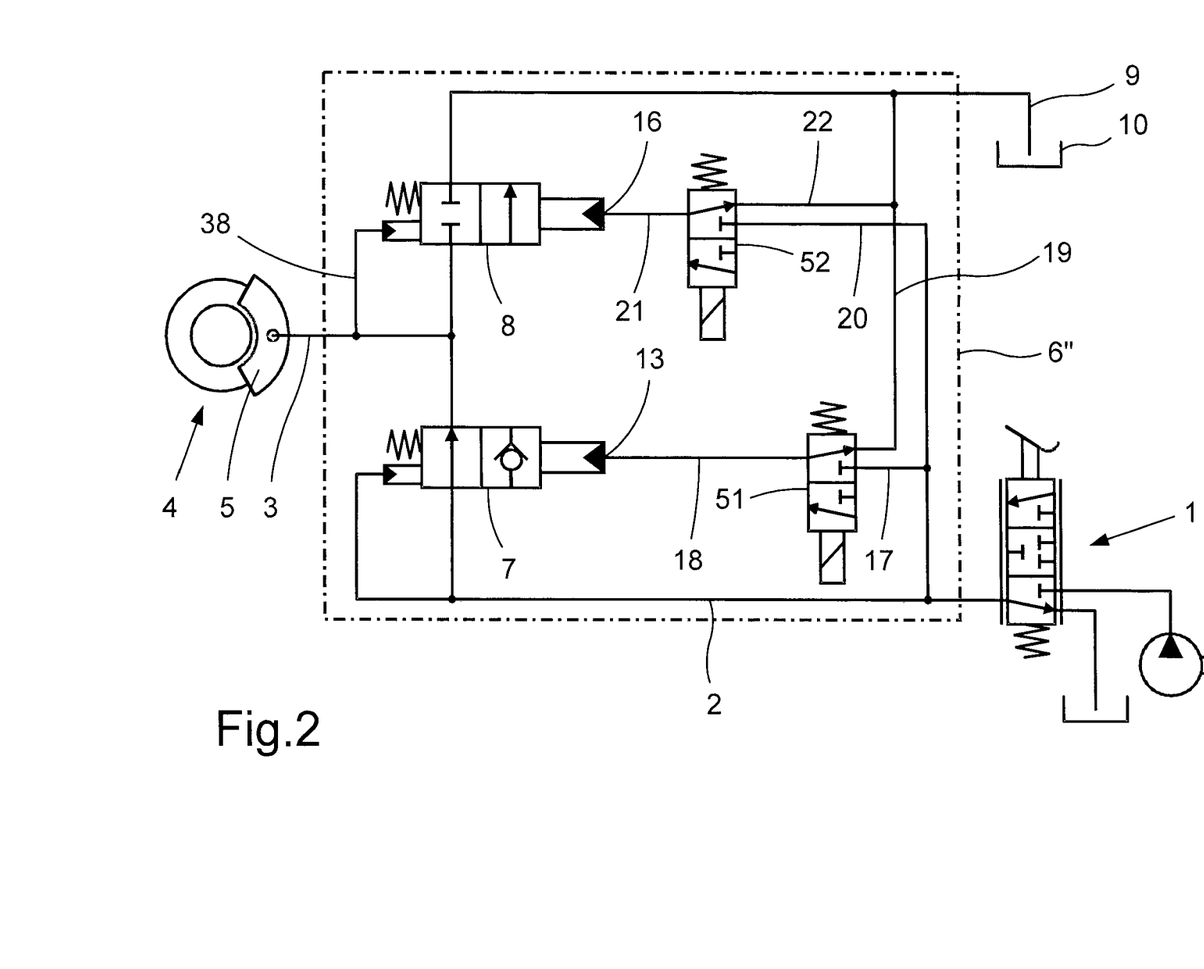
FIG. 2 shows a second valve arrangement of an ABS controller according to an embodiment of the invention for a power-assisted hydraulic braking system of a wheeled vehicle in a schematic view.
Figure 2A:
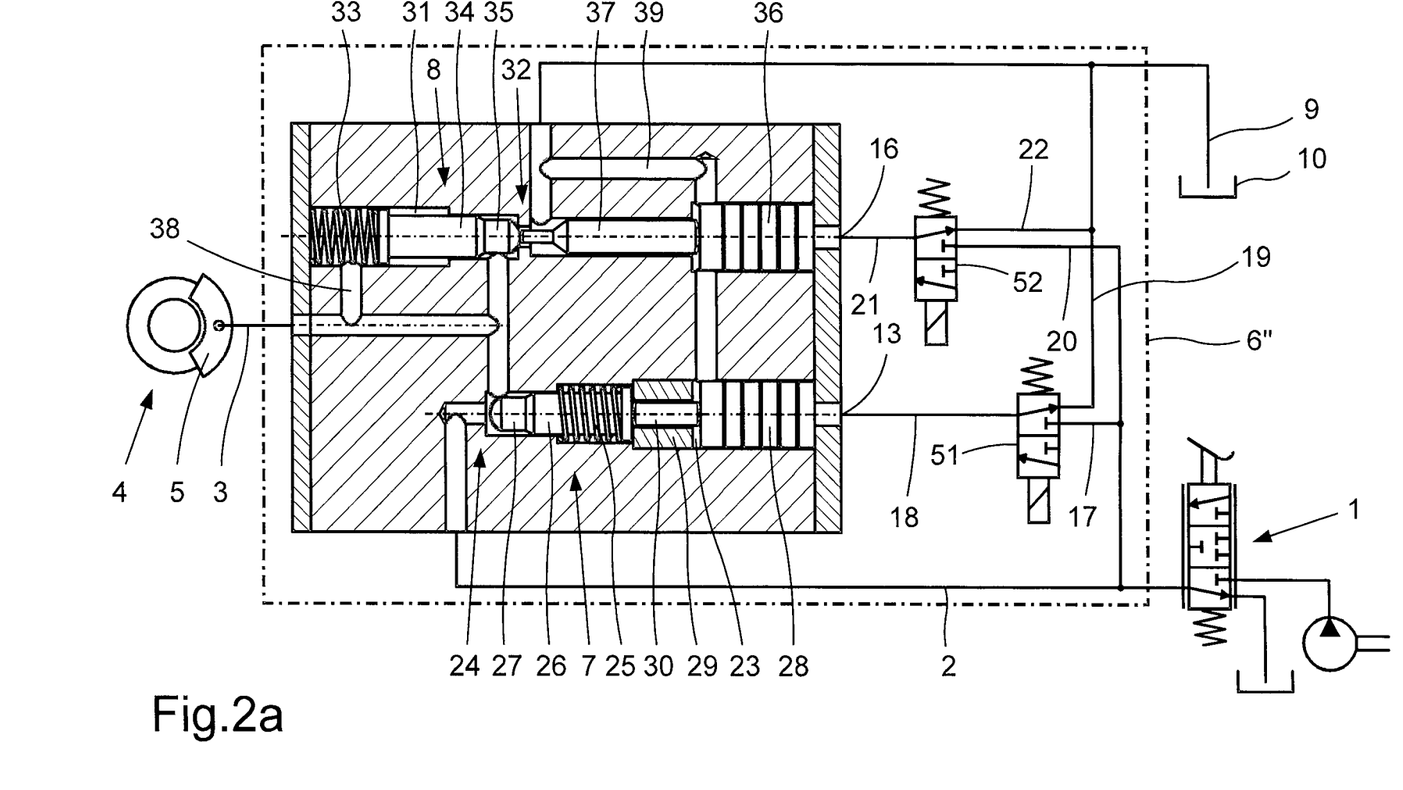
FIG. 2a shows the valve arrangement according to FIG. 2 with a schematic sectional representation of the relevant inlet and outlet valves.

With the same embodiment of the inlet valve 7 and the outlet valve 8, the valve arrangement 6" that is depicted in FIG. 2 in a schematic form and in FIG. 2a with a centrally sectioned representation of the inlet and outlet valves 7, 8 differs from the valve arrangement 6 according to FIGS. 1 and 1a by a different embodiment of the two pilot control valves 51, 52, which are embodied as 3/2-way solenoid switching valves in this case.

The pilot control valve 51 of the inlet valve 7 is disposed between the high-pressure line 17 branching off from the main brake line 2, the control pressure line 18 leading to the control connection 13 of the inlet valve 7 and the low-pressure line 19 leading into the return line 9. In the rest state, i.e. in the deenergized state of the magnetic coil of the pilot control valve 51, the control pressure line 18 is shut off from the high-pressure line 17 and is connected to the low-pressure line 19. In the operating state, i.e. in the energized state of the magnetic coil of the pilot control valve 51, the control pressure line 18 is connected to the high-pressure line 17 and is shut off from the low-pressure line 19. Thus, the control connection 13 of the inlet valve 7 is subjected to the low control pressure or to the ambient pressure in the non-actuated state of the associated pilot control valve 51, and in the actuated state of the pilot control valve 51 is subjected to the brake pressure prevailing in the main brake line 2, which corresponds to the functionality of the two pilot control valves 11, 12 of the inlet valve 7 according to FIGS. 1 and 1a.

The pilot control valve 52 of the outlet valve 8 is disposed between the high-pressure line 20 branching off from the main brake line 2, the control pressure line 21 leading to the control connection 16 of the outlet valve 8 and the low-pressure line 22 leading into the return line 9. In the rest state of the pilot control valve 52, the control pressure line 21 is shut off from the high-pressure line 20 and is connected to the low-pressure line 22. In the operating state of the pilot control valve 52, the control pressure line 21 is connected to the high-pressure line 20 and is shut off from the low-pressure line 22. Thus, the control connection 16 of the outlet valve 8 is subjected to the low control pressure or to ambient pressure in the non-actuated state of the associated pilot control valve 52, and in the actuated state of the pilot control valve 52 is subjected to the brake pressure prevailing in the main brake line 2, which corresponds to the functionality of the two pilot control valves 14, 15 of the outlet valve 8 according to FIGS. 1 and 1a.

Figure 3:
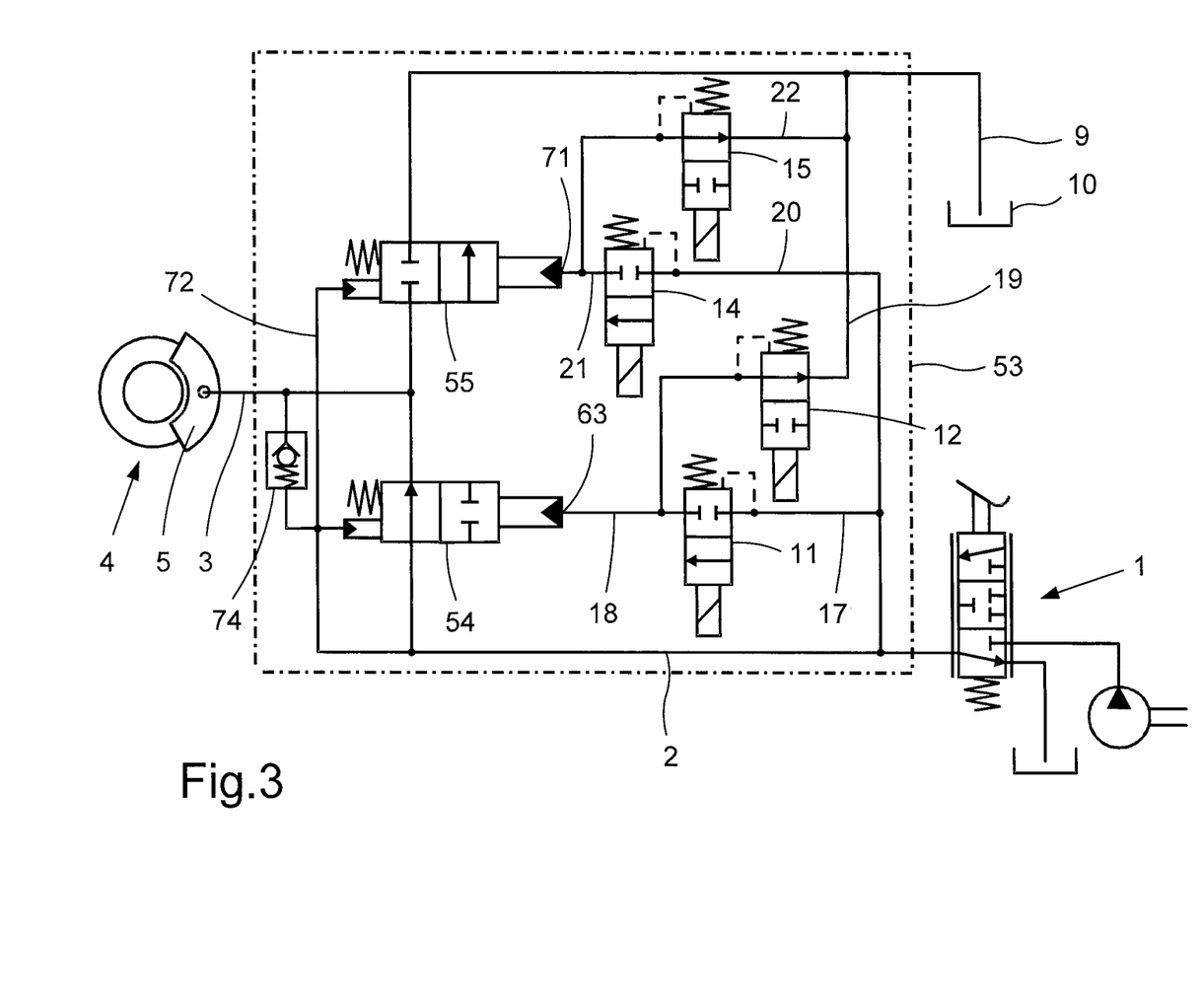
FIG. 3 shows a third valve arrangement of an ABS controller according to an embodiment of the invention for a power-assisted hydraulic braking system of a wheeled vehicle in a schematic view.
Figure 3A:
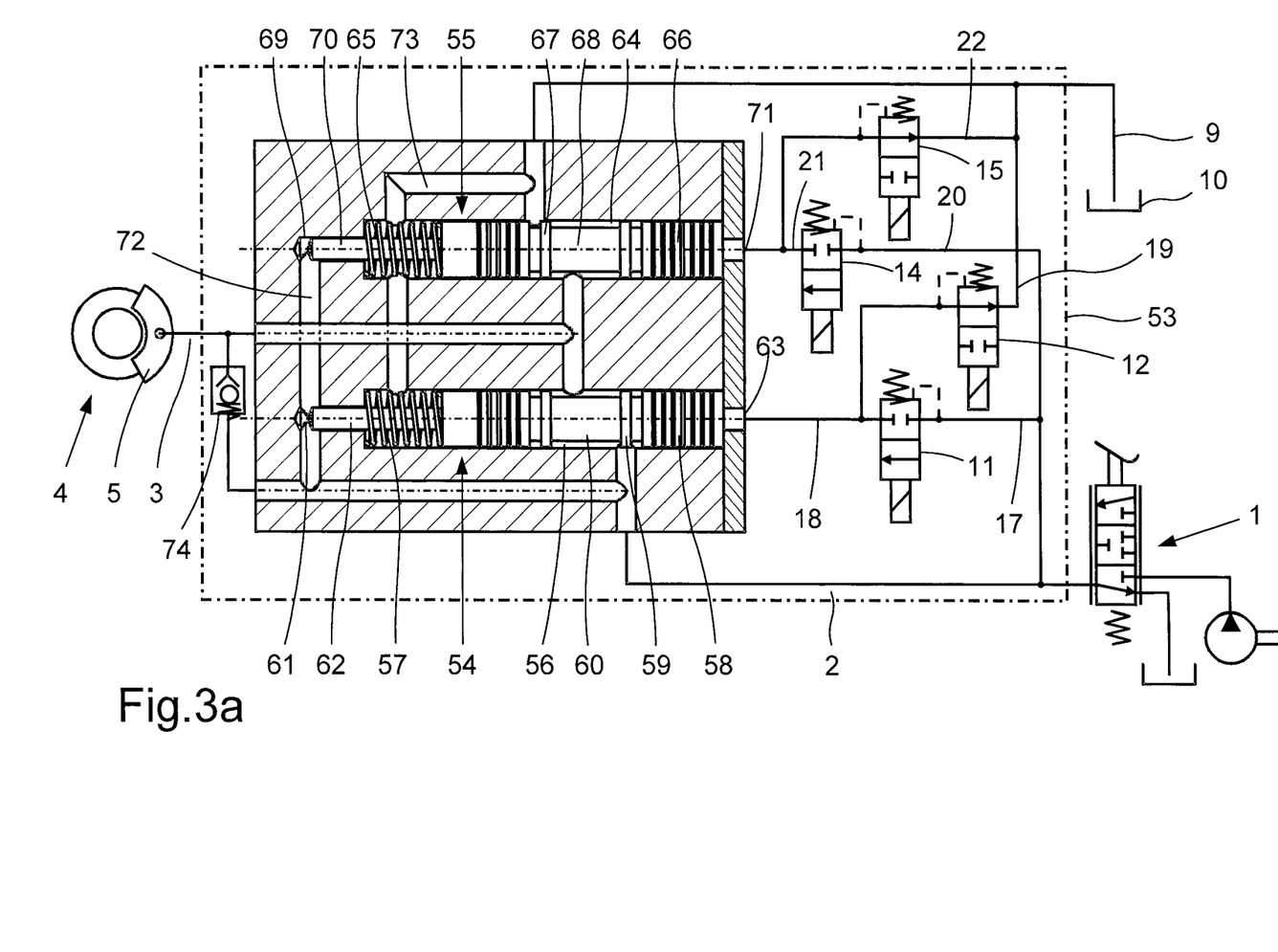
FIG. 3a shows the valve arrangement according to FIG. 3 with a sectional representation of the relevant inlet and outlet valves.

In FIGS. 3 and 3a, a section of a power-assisted hydraulic braking system of a wheeled vehicle is depicted that comprises the valve arrangement 53 of an ABS controller associated with a single wheel brake 4. In FIG. 3, the valve arrangement 53 is depicted in a purely schematic form, in FIG. 3a with centrally sectionally represented inlet and outlet valves 54, 55. Whereas the design and arrangement of the pilot control valves 11, 12; 14, 15 corresponds to the valve arrangement according to FIGS. 1 and 1a, in contrast thereto the inlet valve 54 and the outlet valve 55 are embodied as slide valves with basically the same functionality.

The inlet valve 54 comprises a cylindrical valve bore 56, in which a control piston 58 is disposed that is held in an open switch position in the rest state by a valve spring 57. The control piston 58 comprises an annular control web 59 and axially adjacent thereto an annular connecting groove 60. The main brake line 2 and the wheel brake line 3 open radially into the valve bore 56 in the region of the control web 59 and in the region of the connecting groove 60 respectively. The control connection 63 of the associated control pressure line 18 is disposed on the outside of the valve bore 56 facing axially away from the valve spring 57. When the control connection 63 is switched to the pressureless state, the control web 59 of the control piston 58 is disposed centrally above the opening of the main brake line 2, so that the wheel brake line 3 is then connected to the main brake line 2 via the connecting groove 60 of the control piston 58. When the control connection 63 is subjected to the high control pressure, the control piston 58 is forced axially inwards against the restoring force of the valve spring 57 and a hydraulic counterforce, whereby the control web 59 of the control piston 58 lies on the valve spring side at the edge of the opening of the main brake line 2, and the wheel brake line 2 is thus shut off from the main brake line 2.

Similarly, the outlet valve 55 comprises a cylindrical valve bore 64, in which is disposed a control piston 66 that is held in the rest state by a valve spring 65 but in a closed switch position. Said control piston 66 also comprises an annular control web 67 and is axially adjacent an annular connecting groove 68. The return line 9 and the wheel brake line 3 open radially into the valve bore 64 in the region of the control web 67 and in the region of the connecting groove 68 respectively. The control connection 71 of the relevant control pressure line 21 is disposed on the outside of the valve bore 64 axially facing away from the valve spring 65.

With the control connection 71 of the outlet valve 55 switched to the pressureless state, the control web 67 of the control piston 66 is disposed on the control pressure side on the outer edge of the opening of the return line 9, so that the wheel brake line 3 is then shut off from the return line. With the control connection 71 subjected to the high control pressure, the control piston 66 is forced axially inwards against the restoring force of the valve spring 65 and a hydraulic counterforce, whereby the control web 67 of the control piston 66 lies centrally over the opening of the return line 9 and the wheel brake line 2 is thus connected to the return line 9.

To produce a limited hydraulic counterforce, which acts on the respective control piston 58, 66 as with the relevant valve spring 57, 65 against the control force introduced via the associated control connection 63, 71, the valve bores 56, 64 of the inlet valve 54 and the outlet valve 55 each comprise a coaxial expansion bore 61, 69 with a reduced diameter compared to the valve bores 56, 64, in each of which is axially movably guided a cylindrical pin 62, 70 that is in contact with or can be brought into contact with the control piston 58, 66, and into which a control pressure line 72 branching off from the main brake line 2 is fed at the ends thereof.

To relieve pressure and to discharge leakage oil, a leakage line 73 leads into the return line 9 in the region of each valve spring 57, 65 from the valve bore 56 of the inlet valve 54 via the valve bore 64 of the outlet valve 55.

In order to enable a rapid build-up of pressure in the wheel brake line 3 with the brake pedal released and the inlet and outlet valves 54, 55 closed, a non-return valve 74 that opens towards the main brake line 2 is disposed in parallel with the inlet valve 54 between the wheel brake line 3 and the main brake line 2.

Figure 4:
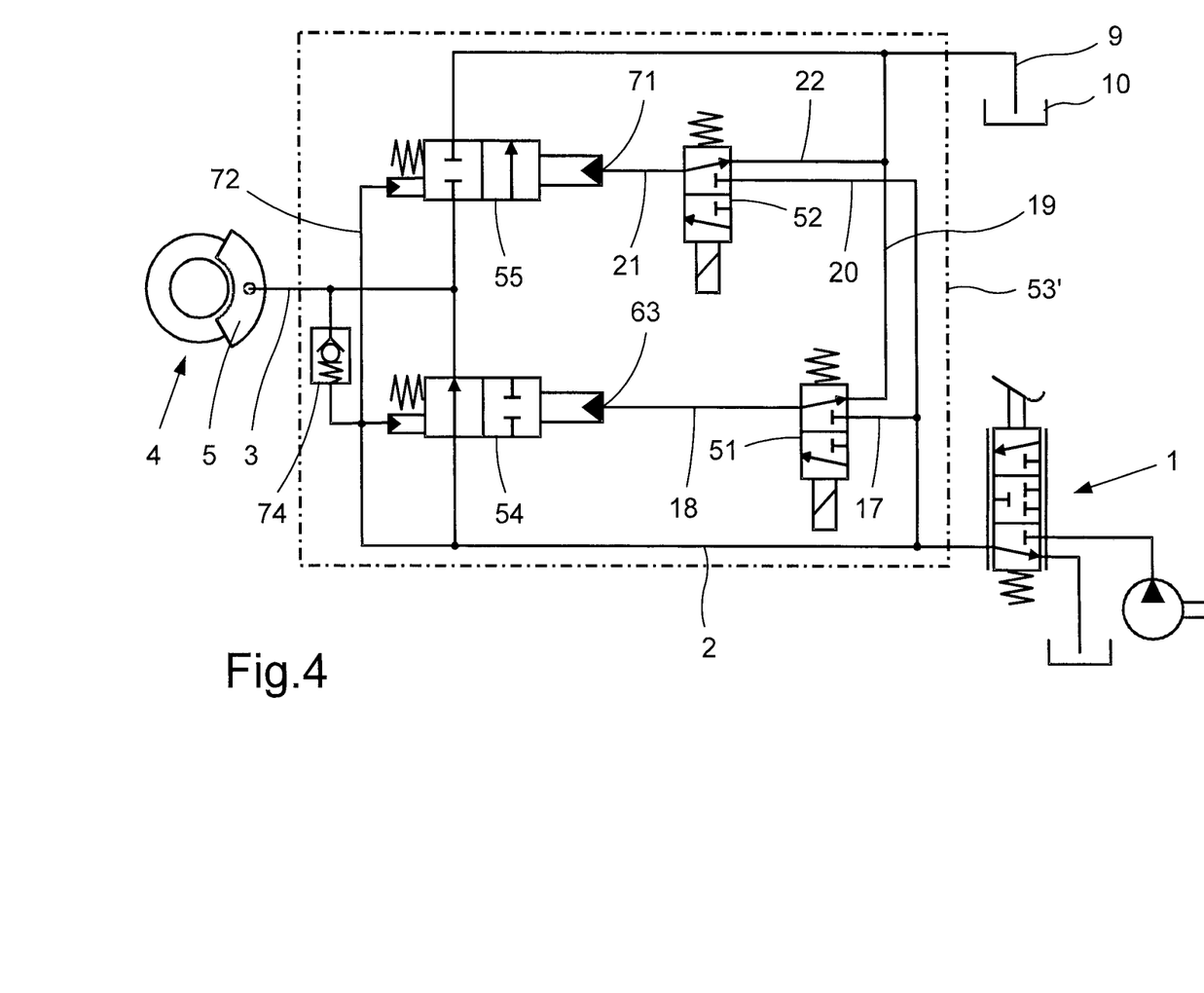
FIG. 4 shows a fourth valve arrangement of an ABS controller according to an embodiment of the invention for a power-assisted hydraulic braking system of a wheeled vehicle in a schematic view.
Figure 4A:
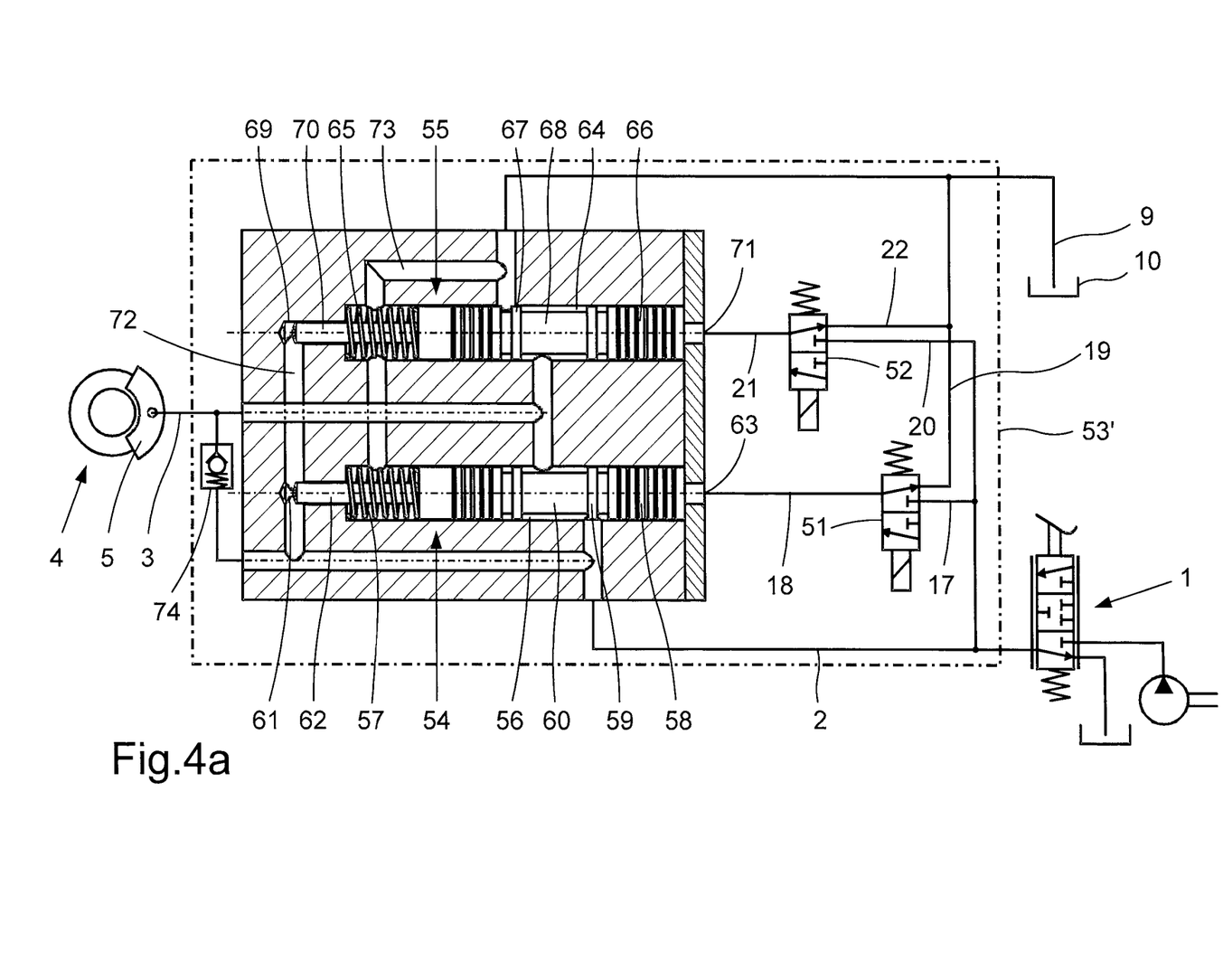
FIG. 4a shows a valve arrangement according to FIG. 4 with a schematic sectional representation of the relevant inlet and outlet valves.

With identical embodiments of the inlet valve 54 and the outlet valve 55, the valve arrangement 53' depicted in FIG. 4 in a purely schematic form and in FIG. 4a with a centrally sectioned representation of the inlet and outlet valves 54, 55 differs from the valve arrangement 53 according to FIGS. 3 and 3a only in that, similarly to the valve arrangement 6" according to FIGS. 2 and 2a, instead of two pilot control valves 11, 12; 14, 15 embodied as 2/2-way solenoid switching valves in each case, one pilot control valve 51, 52 embodied as a 3/2-way solenoid switching valve is now used in each case with basically the same functionality.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 brake valve
2 main brake line
3 wheel brake line
4 wheel brake
5 actuating unit, brake caliper
6, 6', 6" valve arrangement
7 inlet valve, poppet valve
8 outlet valve, poppet valve
8' outlet valve, cascaded poppet valve
9 return line
10 collecting container
11 first pilot control valve, 2/2-way solenoid switching valve
12 second pilot control valve, 2/2-way solenoid switching valve
13 control connection
14 first pilot control valve, 2/2-way solenoid switching valve
15 second pilot control valve, 2/2-way solenoid switching valve
16 control connection
17 high-pressure line
18 control pressure line
19 low-pressure line
20 high-pressure line
21 control pressure line
22 low-pressure line
23 valve bore
24 valve seat
25 valve spring
26 seat piston
27 seat section
28 control piston
29 tappet
30 sleeve
31 valve bore
32 valve seat
33 valve spring
34 seat piston
35 seat section
36 control piston
37 tappet
38 control pressure line
39 leakage line
41 valve bore
42 first valve seat
43 first valve spring
44 seat sleeve
45 second valve seat
46 second valve spring
47 seat piston
48 seat section
49 control piston
50 tappet
51 pilot control valve, 3/2-way solenoid switching valve
52 pilot control valve, 3/2-way solenoid switching valve
53, 53' valve arrangement
54 inlet valve, slide valve
55 outlet valve, slide valve
56 valve bore
57 valve spring
58 control piston
59 control web
60 connecting groove
61 expansion bore
62 pin
63 control connection
64 valve bore
65 valve spring
66 control piston
67 control web
68 connecting groove
69 expansion bore
70 pin
71 control connection
72 control pressure line
73 leakage line
74 non-return valve

The invention claimed is:

1. A power-assisted hydraulic braking system of a wheeled vehicle, comprising:
a high pressure main brake line including one or more branches;
a brake valve configured to introduce a setpoint brake pressure into the main brake line, wherein the brake valve is configured to be actuated by a brake pedal;
a wheel brake lines connected to an actuating unit of a wheel brake;
a low pressure return line including one or more branches; and
a valve arrangement of an ABS controller, the valve arrangement comprising:
an inlet valve disposed between the main brake line and the wheel brake line,
an outlet valve disposed between the wheel brake line and the return line,
a first valve set comprising one or more pilot control valves, the first valve set configured to actuate the inlet valve by selectively exposing a control port of the inlet valve to the low pressure return line or to the high pressure main brake line, and
a second valve set comprising one or more pilot control valves, the second valve set configured to actuate the outlet valve by selectively exposing a control port of the outlet valve to the low pressure return line or to the high pressure main brake line,
wherein the inlet valve and the outlet valve are pressure-controlled 2/2-way switching valves with suitably sized switching cross-sections, wherein at least one of the pilot control valves comprises a solenoid switching valve, and wherein the outlet valve is configured to:
(i) occupy an open position in response to the second pilot control valve exposing the outlet valve control port to the low pressure in the return line, the open position fluidly connecting the wheel brake line with the return line via the outlet valve, and
(ii) occupy a closed position in response to the second pilot control valve exposing the outlet valve control port to the high pressure present in the main brake line, the closed position fluidly isolating the wheel brake line from the return line via the outlet valve.

2. The hydraulic braking system as claimed in claim 1, wherein the first valve set comprises two pilot control valves, wherein each of the two pilot control valves of the first valve set is a 2/2-way solenoid switching valve, wherein the second valve set comprises two pilot control valves, wherein each of the two pilot control valves of the second valve set is a 2/2-way solenoid switching valve;

wherein a first pilot control valve of the first valve set and a first pilot control valve of the second valve set are respectively configured to expose the inlet valve control port and the outlet valve control port to high pressure present in the one or more branches of the main brake line;

wherein a second pilot control valve of the first valve set and a second pilot control valve of the second valve set are respectively configured to expose the inlet valve control port and the outlet valve control port to low pressure in the one or more branches of the return line;

wherein the first pilot control valves are configured to occupy a closed state when deenergized and an open state when energized and wherein the second pilot control valves are configured to occupy an open state when deenergized and a closed state when energized such that:

when the first and second valve sets are deenergized, the inlet valve control port and the outlet valve control port are both exposed to low pressure in the return line, and when the first and second valve sets are energized, the inlet valve control port and the outlet valve control port are both exposed to high pressure in the main brake line.

3. The hydraulic braking system as claimed in claim 1, wherein the first valve set and the second valve set each respectively comprise a pilot control valve embodied as a 3/2-way solenoid switching valve;

the 3/2-way solenoid switching valve of the first valve set being disposed between (i) the main brake line, (ii) an inlet control pressure line leading to the inlet valve control port, and (iii) the return line, the 3/2-way solenoid switching valve of the first valve set being configured to occupy a (i) deenergized state fluidly connecting the inlet valve control port to the return line and (ii) an energized state fluidly connecting the inlet valve control port to the main brake line, the 3/2-way solenoid switching valve of the second valve set being disposed between (i) the main brake line, (ii) an outlet control pressure line leading to the outlet valve control port, and (iii) the return line, the 3/2-way solenoid switching valve of the second valve set being configured to occupy a (i) deenergized state fluidly connecting the outlet valve control port to the return line and (ii) an energized state fluidly connecting the outlet valve control port to the main brake line.

4. The hydraulic braking system as claimed in claim 1, wherein the inlet valve and/or the outlet valve is/are embodied as a poppet valve comprising a port for the wheel brake line, one of the control ports, and a port for the (i) main brake line or (ii) the return line.

5. The hydraulic braking system as claimed in claim 4, wherein the inlet valve comprises a valve bore narrowing inwards in stages with an inner-lying valve seat, in which are disposed a seat piston that is held in a position raised from the valve seat by a valve spring in the rest state and axially on the outside a control piston that is joined to the seat piston, wherein the main brake line opens radially into the valve bore axially inwards next to the valve seat, wherein the wheel brake line opens radially into the valve bore axially on the outside next to the valve seat, and wherein the inlet valve control port for the is disposed axially on the outside on the valve bore.

6. The hydraulic braking system as claimed in claim 5, wherein the seat piston of the inlet valve comprises a tapered seat section at the end thereof facing towards the valve seat.

7. The hydraulic braking system as claimed in claim 4, wherein the outlet valve comprises a valve bore narrowing axially inwards in stages on both sides with an axially inner-lying valve seat, in which are disposed axially on one side a seat piston that is held in a position in contact with the valve seat by a valve spring in the rest state, and axially opposite a control piston connected to the seat piston, wherein the return line opens radially into the valve bore axially on the control piston side next to the valve seat, wherein the wheel brake line opens radially into the valve bore axially on the seat piston side next to the valve seat, and wherein the outlet valve control port is disposed in the valve bore axially on the outside on the control piston side.

8. The hydraulic braking system as claimed in claim 4, wherein the outlet valve is embodied as a cascaded poppet valve comprising a valve bore narrowing axially inwards in stages on both sides with an axially inner-lying first valve seat, wherein in said valve bore are disposed a seat sleeve with a second valve seat loaded by a first valve spring in the opening direction axially on one side, and radial bores axially adjacent thereto, wherein radially within the seat sleeve is disposed a seat piston that is held in the rest state by a second valve spring in a position in contact with the second valve seat and supported on the seat sleeve, and a control piston with a control connection to the seat piston is disposed axially opposite, wherein the return line opens radially into said valve bore axially on the control piston side next to the first valve seat, wherein the wheel brake line opens radially into said valve bore axially on the seat sleeve side next to the first valve seat, and the outlet valve control port is disposed axially on the outside on the control piston side.

9. The hydraulic braking system as claimed in claim 7, wherein the seat piston of the outlet valve comprises a tapered seat section at the end thereof facing towards the valve seat or the second valve seat, and that a control pressure line branching off from the wheel brake line is fed into the valve bore on the side of the seat piston axially facing away from the valve seat.

10. The hydraulic braking system as claimed in claim 1, wherein the inlet valve and/or the outlet valve is/are embodied as a slide valve comprising a port for the wheel brake line, one of the control ports, and a port for the (i) main brake line or (ii) the return line.

11. The hydraulic braking system as claimed in claim 10, wherein the inlet valve comprises a cylindrical valve bore, in which is disposed a control piston with an annular control web and an axially adjacent annular connecting groove that is held by a valve spring in an open switch position in the rest state, wherein the main brake line opens radially into the valve bore in the region of the control web, wherein the wheel brake line opens radially into the valve bore in the region of the connecting groove, and in which the inlet valve control port is disposed on the outside the valve bore facing away from the valve spring in the axial direction.

12. The hydraulic braking system as claimed in claim 10, wherein the outlet valve comprises a cylindrical valve bore in which a control piston with an annular control web and an axially adjacent annular connecting groove is disposed that is held in a closed switch position by a valve spring in the rest state, wherein the return line opens radially into the valve bore in the region of the control web, wherein the wheel brake line opens radially into the valve bore in the region of the connecting groove, and in which the outlet valve control port is disposed on the outside facing away from the valve spring in the axial direction.

13. The hydraulic braking system as claimed in claim 11, wherein the valve bore comprises a coaxial expansion bore with a reduced diameter compared to the valve bore, in which a cylindrical pin that is in contact with or that can be brought into contact with the control piston is axially movably guided, and into which a control pressure line branching off from the main brake line is fed at the end.

14. The hydraulic braking system as claimed in claim 11, wherein a non-return valve that opens towards the main brake line is disposed in parallel with the inlet valve between the wheel brake line and the main brake line.

15. The hydraulic braking system as claimed in claim 1, wherein the inlet valve, the outlet valve and the pilot control valves are combined within a valve module.

16. A power-assisted hydraulic braking system of a wheeled vehicle, comprising:
a high pressure main brake line including one or more branches;
a brake valve configured to introduce a setpoint brake pressure into the main brake line, wherein the brake valve is configured to be actuated by a brake pedal;
a wheel brake line connected to an actuating unit of a wheel brake;
a low pressure return line including one or more branches; and
a valve arrangement of an ABS controller, the valve arrangement comprising:
an inlet valve disposed between the main brake line and the wheel brake line,
an outlet valve disposed between the wheel brake line and a low pressure return line, wherein the inlet valve and the outlet valve are embodied as pressure-controlled 2/2-way switching valves with suitably sized switching cross-sections,
a first valve set comprising one or more pilot control valves, the first valve set configured to actuate the inlet valve by selectively exposing a control port of the inlet valve to the low pressure return line or to the high pressure main brake line, and
a second valve set comprising one or more pilot control valves, the second valve set configured to actuate the outlet valve by selectively exposing a control port of the outlet valve to the low pressure return line or to the high pressure main brake line;
wherein at least one of the pilot control valves comprises a solenoid switching valve,
wherein the outlet valve comprises:
a seat piston comprising an annular seat section configured to seal against a valve seat,
a valve spring biasing the annular seat section into sealing engagement with the valve seat,
a control piston in fluid communication with the outlet valve control port, and
a tappet disposed between the control piston and the seat piston, wherein the control piston is configured to push the tappet toward the seat piston to oppose the biasing spring force and thereby release the annular seat section from the valve seat.

17. The hydraulic braking system as claimed in claim 16, wherein the control piston is slidingly confined within a cylindrical bore and configured to occupy (i) a first position in which the seat piston pushes the tappet against the control piston under the biasing spring force while the annular seat section sealingly engages the valve seat and (ii) a second position in which the control piston pushes the tappet against the seat piston, lifting the annular seat section from the valve seat and compressing the valve spring, and
the second valve set being configured to cause the control piston to move from the first position to the second position by fluidly connecting the outlet valve control port with the high pressure in the main brake line.

18. The hydraulic braking system as claimed in claim 16, configured such that (i) fluid connection between the wheel brake line and the low pressure return line via the wheel brake line is severed when the control piston occupies the first position and (ii) the wheel brake line fluidly connects to the low pressure return line via the outlet valve when the control piston occupies the second position.

19. The hydraulic braking system as claimed in claim 16, wherein the inlet valve comprises:
a control piston in fluid communication with the inlet valve control port;
a seat piston comprising an annular seat section configured to seal against a valve seat;
a valve spring biasing the annular seat section away from sealing engagement with the valve seat;
the inlet valve being configured to (i) fluidly connect the wheel brake line with the high pressure main brake line when the valve seat is disposed away from sealing engagement with the valve seat and (ii) fluidly disconnect the wheel brake line from the high pressure main brake line when the valve seat is disposed in sealing engagement with the valve seat.

20. The hydraulic braking system as claimed in claim 19, further comprising an oil leakage line comprising:
a first section extending directly from the inlet valve control piston to the outlet valve control piston, and
a second section extending directly from the outlet valve control piston to the one or more branches of the low pressure return line.

* * * * *